US006264783B1

(12) United States Patent
Oez et al.

(10) Patent No.: US 6,264,783 B1
(45) Date of Patent: Jul. 24, 2001

(54) PROCESS FOR APPLYING INSCRIPTIONS

(75) Inventors: Buelent Oez, Heppenheimer Strasse 31-33, 68309 Mannheim; Michael Lambertson, Ladenburg, both of (DE)

(73) Assignee: Buelent Oez, Mannheim (DE)

( * ) Notice: Subject to any disclaimer, the term of this patent is extended or adjusted under 35 U.S.C. 154(b) by 0 days.

(21) Appl. No.: 09/147,843

(22) PCT Filed: Sep. 4, 1997

(86) PCT No.: PCT/EP97/04803

§ 371 Date: May 28, 1999

§ 102(e) Date: May 28, 1999

(87) PCT Pub. No.: WO98/12054

PCT Pub. Date: Mar. 26, 1998

(30) Foreign Application Priority Data

Sep. 18, 1996 (DE) .............................................. 196 37 979

(51) Int. Cl.[7] .............................. B32B 31/26; B44C 1/165

(52) U.S. Cl. ........................ 156/241; 156/230; 156/272.2; 156/275.7; 392/418; 219/492

(58) Field of Search .................................... 156/230, 240, 156/241, 272.2, 273.7, 275.7; 219/492; 392/407, 411, 416, 418; 315/246

(56) References Cited

U.S. PATENT DOCUMENTS

| | | | | |
|---|---|---|---|---|
| 4,256,951 | * | 3/1981 | Payne et al. | 219/492 |
| 4,681,034 | | 7/1987 | Schulzen et al. | 101/211 |
| 4,728,777 | * | 3/1988 | Tsisios et al. | 219/405 |
| 4,943,684 | | 7/1990 | Kramer | 428/34.4 |
| 5,296,081 | * | 3/1994 | Morin et al. | 156/498 |
| 5,711,837 | * | 1/1998 | Kantrowitz | 156/215 |
| 5,755,921 | * | 5/1998 | Christensen | 156/391 |
| 5,997,678 | * | 12/1999 | Wess et al. | 156/240 |

FOREIGN PATENT DOCUMENTS

| | | |
|---|---|---|
| 42 21 295 | 1/1994 | (DE) . |
| 43 28 119 | 11/1995 | (DE) . |
| 0 119 548 | 9/1984 | (EP) . |
| 1 444 368 | 7/1976 | (GB) . |

* cited by examiner

*Primary Examiner*—Michael W. Ball
*Assistant Examiner*—Michael A. Tolin
(74) *Attorney, Agent, or Firm*—Foley & Lardner

(57) ABSTRACT

A method of applying an inscription on a copying paper to a heat-resistant surface, such as an exterior surface of a cup, where the paper bears the inscription to be applied to the cup via heat. The heat is provided to the paper exclusively from the rear of an object to be inscribed, where the heat is provided by a halogen lamp. A sufficient temperature is generated at the surface of the object to thereby adhere the inscription to the surface, and then the paper is pulled off.

11 Claims, 2 Drawing Sheets

PROCESS FOR APPLYING INSCRIPTIONS

BACKGROUND OF THE INVENTION

1. Field of the Invention

The present invention relates to a process and a device for applying inscriptions on copying papers to surfaces of heat-resistant materials, such as, in particular, mineral objects made of ceramic or glass or those made of metals.

The papers used for this purpose are printed with the aid of Xerox copying devices or using the video print process, said papers being designed as transfer papers and having, on the carrier paper, a plastic coating which can be printed and separated from the paper. Photocopying papers of this type have in printing layer, for example, a binder and a pigment, the so called toner, embedded in said binder. Other papers which may be used are so called video printer papers which, after they have been printed, bear sublimation inks.

2. Description of the Related Art

The use of photocopying papers for applying inscriptions to cups is known. For this purpose, a clamping cuff or heating jaw is placed around the cup under pressure, and presses the paper with the printed side against the cup. The cuff is provided with a heating filament, which heats the layer with the inscription via the carrier paper layer and softens the binder (polyester). After the temperature has been reduced, the paper can be pulled off, the inscription remains on the cup (JP 07242099, DE 4221 295 A1).

The disadvantage with such a procedure is as follows. On the one hand, the heating filament located in the cuff is subjected to an expansion stress which changes during each transfer operation and damages the heating filament; the device is susceptible to faults. On the other hand, the transfer operation is time-consuming, since the heat is built up slowly and the elastic material of the cuff conducts the heat poorly. In order to build up the required temperature (about 200° C.), from 5 to 8 minutes are needed. Inscriptions with an unsatisfactory resistance to washing are produced on the cups, the mechanical loading is disadvantageous for the paper and the quality of the color.

SUMMARY OF THE INVENTION

The present invention has therefore taken as its objective the provision of a process and a device for the abovementioned purposes which has a substantially reduced susceptibility to faults, it being possible for the inscriptions to be applied significantly faster and, with the aid of said invention, the inscriptions become more resistant to washing and scratching. In relation to a development, high reproducibility and a very low output of electromagnetic radiation (EMC) are to be ensured at the same time.

This object is achieved by a process for applying inscriptions on copying papers to surfaces of heat-resistant surfaces, such as mineral or metallic surfaces, in particular ceramic surfaces, the paper bearing the inscription being pressed onto the surface and heated and, according to the invention, the heat being allowed to act from the rear of the object to be provided with an inscription, generating a temperature on the surface at which the inscription is joined to the substrate, the carrier paper then being pulled off and the inscription subsequently being fixed at elevated temperature.

DETAILED DESCRIPTION OF THE PREFERRED EMBODIMENTS

Figure 1:
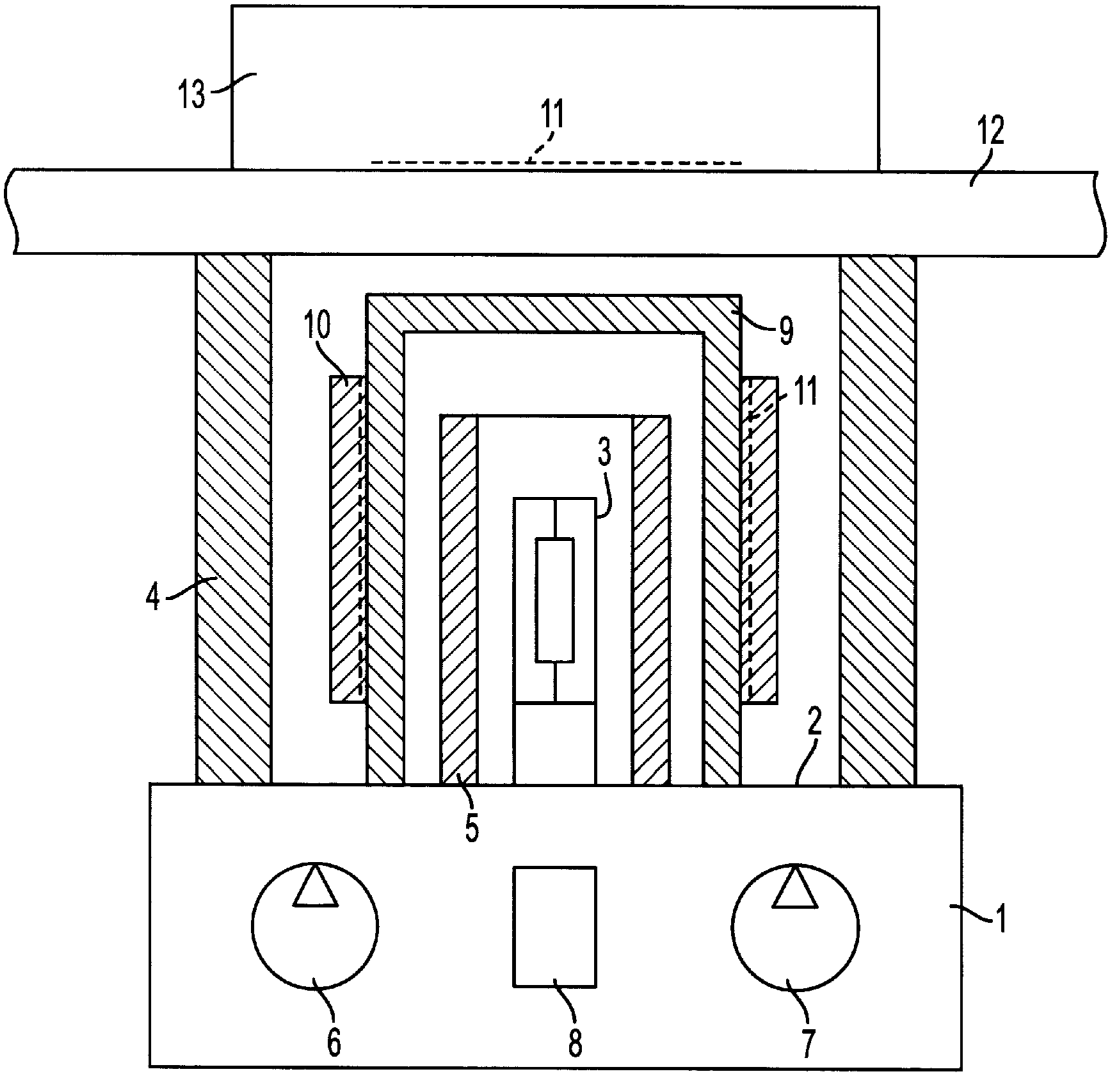
FIG. 1 shows a device according to the invention.

By means of trials, it has been shown that applying heat from the rear of the substrate to the surface to the provided with an inscription leads to a considerably improved quality of the inscription. In addition, it is possible to use highly energetic radiant heat sources, which accelerate the transfer process from conventionally—relating to providing cups with inscriptions—5 to 8 minutes to 30 to 60 seconds. By means of subsequent fixing of the inscription at elevated temperature, the inscriptions become considerably more stable in relation to detrimental mechanical influences, for example washing, as compared with those inscriptions of the prior art. The fixing operation also proceeds rapidly and likewise requires only 30 to 60 seconds. Since fixing takes place after the paper covering has been pulled off, it is also possible for the application of heat to take place in principle via the side of the inscription. However, it is conveniently readily possible to use the same device (radiation source). The temperature of the fixing treatment may be specified as about 300° C. and above.

The radiation source may in principle be any desired source, but is quite particularly preferably a halogen lamp. Halogen lamps generate a temperature of 1000° C. and above. In the case of larger areas to be provided with an inscription, the lamp may comprise one or more radiant sources, in order to heat the substrate rapidly and uniformly. In particular, the radiant sources may be combined into fields (DE 43 28 119 C2).

In order to provide cups with inscriptions, the release papers bearing the image are applied to the outer wall of the cup and are retained by a cuff or the like. The cup is then slipped over the radiation source, for example a halogen lamp, and the bulb is fired at about half power. In this case, the cup itself constitutes protection against splinters (for the rare cases of the lamp burning out).

After the toner has been joined to the wall of the cup, the cuff is removed, the carrier paper is pulled off, the cup is then slipped over again and the inscription is fixed using the full lamp power.

A further advantage of the process of the invention is that, in contrast to the prior art, the application of heat to the substrate from the rear makes any previous coating (primer) with polyester unnecessary in the case of polyester-containing release papers; the inscriptions may in principle be applied immediately (after the surface has been cleaned).

This is different in the case of using socalled video printer papers, in which the sublimation inks cannot be transferred directly to the base of ceramic or metal; here, a polyester coating has to be applied previously.

The substrates in question in the present case are heated ceramic crockery (cups, plates), likewise tiles, and other relatively thin-walled products which may be heated through in the manner of the invention; likewise also metal plates, for example shields and the like. For the purpose of protection against UV radiation and high mechanical stresses, the areas provided with an inscription can also be lacquered in a manner known per se.

A device for carrying out the process comprises a housing, to whose surface a halogen bulb is fastened in a holder. Provided around the bulb is a support surface, onto which a hollow body to be provided with an inscription can be slipped.

A significant advantage of such a device, in addition to the fact that the cuffs do not have to contain a heating filament, also consists in the fact that replacing the cuffs for applying inscriptions to different cup dimensions is very simple. According to the prior art, the cuffs are permanently connected to the device and cannot be changed, so that in principle it is necessary to use a separate device for each size of cup.

In order to be able to adapt the output of heat power to the size and the wall thickness of the object, the housing has a voltage regulator and, preferably, a time clock.

For the purpose of applying inscriptions to flat products, an insulating collar on whose upper rim (plate) the product can be placed is arranged around the halogen bulb. If the collar is large enough, this may remain fixed to the housing since there will be space within said housing for, for example, cups to be provided with an inscription, together with a clamping cuff. The collar can be folded up, preferably with the aid of a hinge. The bulb itself may be surrounded by a sleeve made of high-temperature resistant glass, or preferably surrounded by a grid, which serves as a protection against splinters.

The development of the abovementioned invention improves the latter to the effect that the temperature control is designed such that the heating of the substrate is highly reproducible, which is of significant importance to constant inscription quality. To this end, it is proposed to switch the radiation source, in particular a halogen lamp, on and off continually at a predefinable frequency, so that said source “flickers”. In this way, by utilizing the temperature hysteresis of the lamp, it is possible to bring the substrate precisely and repeatedly to the desired temperature level and to keep it there, it being possible for the pulse duration and pulse spacing to be varied over the heating phase.

Furthermore, it is proposed to bring about the switching on and off of the heat radiation via a zero-crossover control system.

This means that the lamp is switched on or off at the zero crossover of the alternating voltage, rather than the 50 Hz sine waves of the mains voltage being capped, as in the case of a dimmer. In this way, the radiation of electromagnetic waves which, in the case of dimmers, is caused by the high edge exit rate, is completely suppressed according to the invention, so that no problems occur with regard to EMC (electromagnetic compatibility). The residual radiation from the lamp is intercepted by the metal grid.

A further decisive advantage of pulsing the heat source is that linear regulation of the output of heat is made possible by this. In the case of regulation via a dimmer, this is not so. There, a change of 5% in the rotary angle of the adjustment potentiometer in the end range means a 50% change in temperature. Furthermore, the behavior of the lamp during the heating and aging is also constant. The linearity of temperature adjustment according to the invention also permits the provision of a stepped circuit with a constant adjustment interval of the scale for the heat pulses to be output for each unit time.

The device according to the invention is shown in the appended FIG. 1.

Located in a housing 1 are a voltage regulator 6 and a time clock 7, as well as an on/off switch 8. The housing has a top plate 2 with a holder (not shown) for a halogen lamp 3, which is designed for a high temperature output. The lamp 3 is surrounded by a protective sleeve 5, which, for safety reasons, ensures that no splinters get to the outside if the lamp 3 explodes. The sleeve 5 includes temperature-resistant glass or a metal grid, the latter also ensuring evening of the heat output.

Two variants for providing objects with inscriptions are shown in the figure. The first relates to a hollow body (with a cylindrical wall), such as a cup 9, which is slipped over the lamp 3, is enclosed by a tensionable cuff 10 and which presses the release paper 11 (indicated dashed) which bears the inscription against the outer wall of the cup 9. The cup 9 may rest within an insulating collar 4.

The second variant relates to providing flat objects, for example a plate 12, with an inscription. This article is placed on the insulating collar 4, a pressing tool 13 pressing onto the plate 12 and pressing the release paper 11 (indicated dashed) onto the plate 12. If the latter has a hollow, then the pressing tool 13 is designed to be appropriately elastic.

For the purpose of applying the inscription, the halogen lamp 3 is brought by means of the controller 6 to approximately half-power, in order to heat this substrate carefully to about 200° C. The substrate is then allowed to cool down slightly, the paper layer is pulled off and, for the purpose of fixing, heating at full power is carried out, the substrate being heated to about 300° C.

The heating time is dependent on the mass of the objects to be provided with inscriptions, and for conventional, beaker-like cups, is about 30 to 60 seconds for the two procedures. It is possible for the individual time to be adjusted via the time controller 7.

Figure 2:
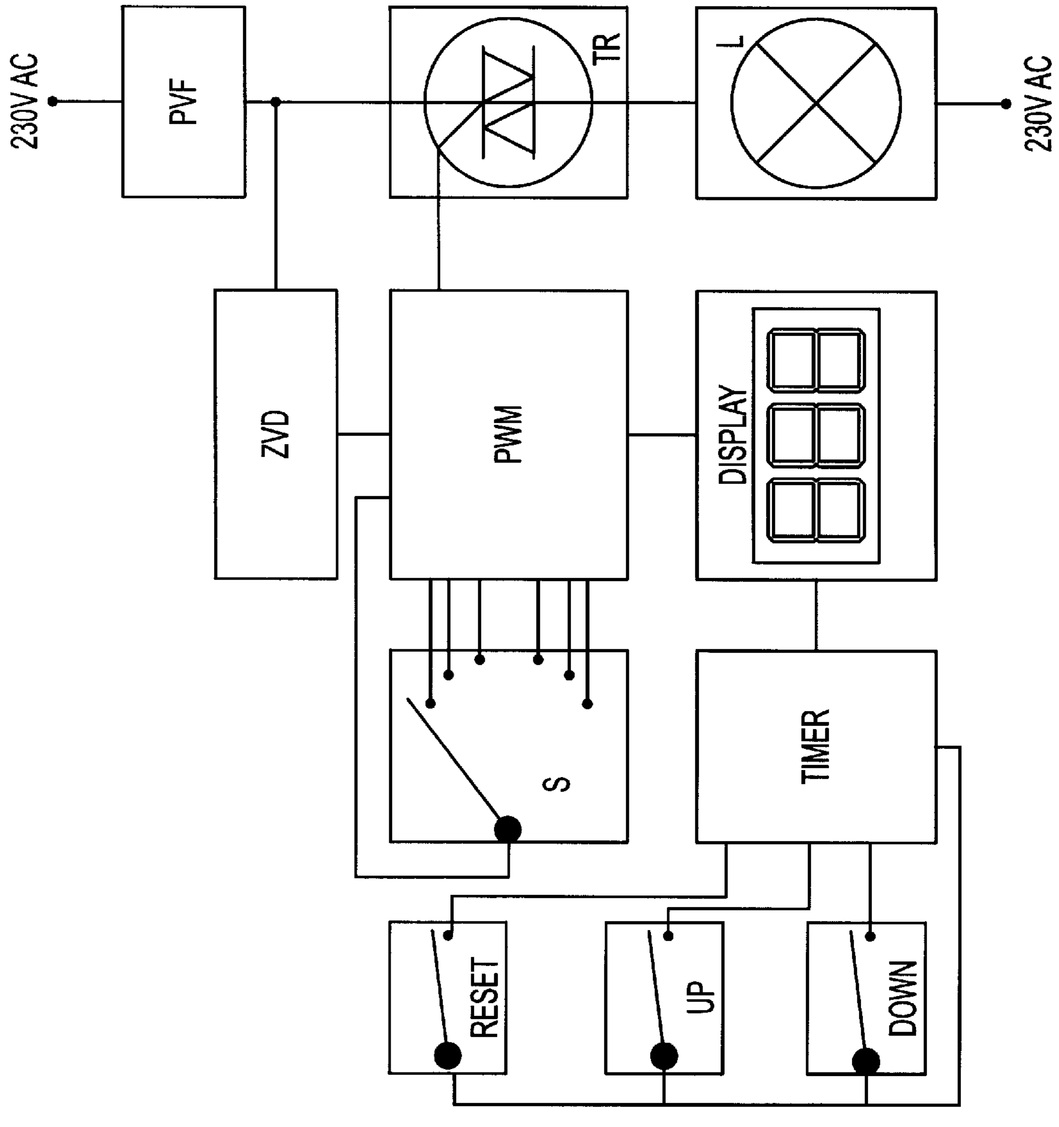
FIG. 2 shows a circuit according to the invention.

A typical circuit, which will be explained below, is shown in FIG. 2.

The heating bulb (L=lamp) is switched on and off via the Triac (TR) connected upstream. The inertia of the heating bulb results in a clearly defined and uniform output of heat. The pulse/pause ratios of the pulse width modulator (PMW) may be set in six defined stages, so that it is possible to achieve a linear increase in heat via the rotary angle of the rotary switch (S).

The zero-crossover detector (ZVD=Zero Voltage Detector) which is connected upstream enables the bulb to be switched at the zero crossover of the mains voltage, in order to minimize EMC problems. Anything remaining is coped with by the mains filter (PVF=Power Voltage Filter) connected upstream.

In order to achieve a defined output of heat from the bulb, the pulse/pause ratios were selected to be asymmetrical, that is to say the bulb is switched on longer than off. The pulse width modulator time is controlled via the timer, which may be adjusted from zero to 400 seconds, or reset, via the switches “Up”, “Down” and “Reset”. The time remaining is indicated on the display. After the transfer operation has been completed, the timer is reset to the time automatically previously set.

What is claimed is:

1. A method of applying an inscription onto a heat-resistant surface of an object, the method comprising:

a) providing a copying paper having the inscription thereon to the heat-resistant surface of the object;

b) providing heat to the copying paper exclusively from a direction in which the heat passes from a surface of the object opposite the heat-resistant surface, through a cross-section of the object, and thereby to the heat-resistant surface of the object, wherein the heat is provided without applying a significant mechanical heating force to the object, and wherein a temperature is generated on the heat-resistant surface of the object on which the inscription is to be applied; and c) pulling off the copying paper from the heat-resistant surface of the object, wherein a lamp is used as a heat source to provide the heat.

2. A method of applying an inscription onto a heat-resistant surface of an object, the method comprising:

a) providing a copying paper having the inscription thereon to the heat-resistant surface of the object;

b) providing heat to the copying paper exclusively from a direction in which the heat passes from a surface of the object opposite the heat-resistant surface, through a cross-section of the object, and thereby to the heat-resistant surface of the object, wherein the heat is provided without applying a significant mechanical heating force to the object, and wherein a temperature is generated on the heat-resistant surface of the object on which the inscription is to be applied; and c) pulling off the copying paper from the heat-resistant surface of the object, wherein a halogen lamp is used as a heat source to provide the heat.

3. The method according to claim 2, wherein the step b) comprises:

b1) providing the heat to the object such that the heat-resistant surface of the object is heated to about 200 degrees C for about 30 to 60 seconds; and b2) thereafter providing the heat to the object such that the heat-resistant surface of the object is heated to about 200 to 600 degrees C for about 30 to 60 seconds, wherein the inscription is affixed to the heat-resistant surface as a result thereof.

4. The method according to claim 2, wherein, if the object has a polyester coat on the heat-resistant surface thereof, the copying paper is provided so as to have sublimination ink.

5. The method according to claim 3, wherein the halogen lamp is periodically switched on and off and radiation pulses are generated during the on times.

6. The method according to claim 5, wherein the halogen lamp is controlled by a triac with a zero-crossing detector connected thereto.

7. The method according to claim 6, wherein the periodic switching results in an on/off ratio that is asymmetric.

8. The method according to claim 2, wherein the object is a cup having an interior region in which liquid is to be contained therein when a user uses the cup, and wherein the heat is provided by providing a heat source within the interior region to thereby heat the heat-resistant surface from a back side thereof.

9. The method according to claim 2, wherein the object is a plane having a first surface and a second surface opposite to the first surface, wherein the first surface is the heat-resistant surface to which the inscription is to be affixed, and wherein the heat is provided at a location wherein the second surface is positioned between a heat source providing the heat and the first surface, and wherein the heat exclusively passes through the second surface and through the cross-section of the object to thereby heat the first surface from a back side thereof.

10. The method according to claim 2, wherein the heat-resistant surfaces correspond to one of mineral and metallic surfaces.

11. The method according to claim 2, wherein the heat-resistant surfaces correspond to ceramic surfaces.

* * * * *